US008356359B2

(12) United States Patent
Rouse et al.

(10) Patent No.: US 8,356,359 B2
(45) Date of Patent: Jan. 15, 2013

(54) LICENSING RIGHTS FOR MEDIA CONTENT THAT FOLLOWS A SUBSCRIBER

(75) Inventors: Alan Rouse, Lawrenceville, GA (US); Charles Dasher, Lawrenceville, GA (US)

(73) Assignee: Ericsson Television, Inc., Duluth, GA (US)

( * ) Notice: Subject to any disclaimer, the term of this patent is extended or adjusted under 35 U.S.C. 154(b) by 325 days.

(21) Appl. No.: 12/762,505

(22) Filed: Apr. 19, 2010

(65) Prior Publication Data

US 2011/0258706 A1 Oct. 20, 2011

(51) Int. Cl.
*G06F 7/04* (2006.01)
*G06F 17/30* (2006.01)

(52) U.S. Cl. .............. 726/26; 726/27; 726/28; 726/29; 726/5; 713/156; 713/158; 713/157; 455/519; 455/414

(58) Field of Classification Search .............. 726/26–30; 713/161–170; 705/51; 455/41
See application file for complete search history.

(56) References Cited

U.S. PATENT DOCUMENTS

| | | | | |
|---|---|---|---|---|
| 7,143,066 B2 * | 11/2006 | Shear et al. | ...................... | 705/54 |
| 8,001,565 B2 * | 8/2011 | Kahn et al. | ...................... | 725/39 |
| 8,036,598 B1 * | 10/2011 | Zhu | .............. | 455/41.2 |
| 8,219,134 B2 * | 7/2012 | Maharajh et al. | .............. | 455/519 |
| 2005/0216418 A1 | 9/2005 | Davis et al. | | |
| 2006/0015580 A1 * | 1/2006 | Gabriel et al. | ................ | 709/219 |
| 2006/0107046 A1 * | 5/2006 | Raley et al. | .................... | 713/168 |
| 2007/0086372 A1 * | 4/2007 | Lee et al. | ...................... | 370/328 |
| 2007/0219917 A1 * | 9/2007 | Liu et al. | .......................... | 705/59 |
| 2008/0147530 A1 * | 6/2008 | Kwan et al. | ..................... | 705/34 |
| 2008/0177994 A1 * | 7/2008 | Mayer | ............................... | 713/2 |
| 2008/0250508 A1 * | 10/2008 | Montague et al. | .............. | 726/28 |
| 2008/0263681 A1 | 10/2008 | Dooms et al. | | |
| 2009/0193526 A1 * | 7/2009 | Sweazey | ......................... | 726/30 |
| 2010/0031366 A1 * | 2/2010 | Knight et al. | ................... | 726/26 |
| 2010/0058485 A1 * | 3/2010 | Gonzalez | ........................ | 726/27 |
| 2011/0010777 A1 * | 1/2011 | Robert | ........................... | 726/29 |

OTHER PUBLICATIONS

Pestoni F, Peer to Peer Content Protection, Mar. 2004, IEEE, vol. 21 Issue 2, pp. 7-11.*

* cited by examiner

*Primary Examiner* — Nathan Flynn
*Assistant Examiner* — Viral Lakhia

(57) ABSTRACT

Various embodiments of the present invention relate to systems, methods, and computer-readable medium providing licensing rights for media content that follows a subscriber so that the subscriber may experience the media content on various content distribution platforms. In particular embodiments, the systems, methods, and computer-readable medium transfer licensing rights for a user for particular media content that is associated with a first device on a first distribution platform so that the rights are associated with a second device on a second distribution platform. As a result, in various embodiments, the user is able to experience the particular media content with the use of the second device on the second distribution platform.

18 Claims, 8 Drawing Sheets

LICENSING RIGHTS FOR MEDIA CONTENT THAT FOLLOWS A SUBSCRIBER

BACKGROUND OF THE INVENTION

1. Field of the Invention

The disclosed invention generally relates to systems and methods for providing licensing rights for media content that follows a subscriber so that the subscriber may experience the media content on various content distribution platforms.

2. Description of the Related Art

Today, individuals are provided with numerous resources/services for requesting media content. In many instances, an individual will request or pay for a license to experience particular media content for a time duration. For instance, a subscriber of a video service provider (such as a cable service provider) will often rent a movie offered by the video service provider through the provider's video-on-demand (VOD) service. In this particular instance, the video service provider may provide a license to the subscriber that enables the subscriber to view the movie through the service provider's distribution network for a particular time period (such as twenty-four hours). In another example, an individual may be staying in a hotel room and may rent a movie through the hotel's video service so that the individual may view the movie on the television set in his room while staying at the hotel. Further, in another example, an individual may subscribe to a wireless provider who also provides content media on the individual's wireless device for a subscription fee, such as movies, videos, and/or music.

Typically, owners and/or providers of media content employ licensing mechanisms to enforce restrictions on the use of copyrighted content. For instance, owners of media content may employ digital rights management (DRM). This particular type of licensing mechanism may involve downloading a DRM license to a device an individual uses to experience copyrighted content (e.g., a DRM license is downloaded to an individual's set-top box when the individual rents a movie through a video service provider). The premise behind this type of mechanism is to give an individual licensing rights to a piece of content based on certain conditions. For example, the DRM license may comprise rules for enforcing the license with respect to the particular piece of content and a decryption key for decrypting the content. For instance, the DRM license may allow the individual to view the content once, or for a set period of time, or on a particular device. Further, in many instances, the device used to view the content includes a DRM client that enforces the rules included in the DRM license and facilitates decrypting the content if allowed by the rules. Thus, the device, by "executing" the DRM license, is responsible for enforcing restrictions on the use of the copyrighted content.

In other instances, a content provider may employ restrictions at the point of distribution (e.g., a cable service provider may employ restrictions at the headend of its distribution network). For example, an individual may have purchased licensing rights to view a particular movie provided by a cable service provider for a particular number of times. Thus, in this example, the cable service provider may keep track at the headend of the number of times the particular movie has been streamed to the individual's set-top box. Therefore, the cable provider's headend is responsible for enforcing restrictions on the use of the copyrighted content.

In addition, owners and/or providers may use combinations of mechanisms to enforce restrictions on the use of copyrighted content. For example, a subscriber of a cable service provider may rent a movie (e.g., purchase a license) for viewing through the cable service provider's VOD service. The license purchased by the subscriber may allow the subscriber to view the movie three times during a thirty-six hour time period. In response, the cable service provider's system downloads a DRM license associated with the movie to the subscriber's set-top box. This DRM license includes the decryption key to decrypt the movie stream received by the set-top box and includes a rule based on the thirty-six hour time period. Further, the cable provider institutes the number-of-times restriction at the headend of its distribution network.

The subscriber initiates viewing the movie by turning to the appropriate television channel and by selecting "play" on the subscriber's remote control. In response, the cable service provider's system confirms the number of times the subscriber has had the movie streamed to the subscriber's set-top box. If the total is less than three, the cable service provider streams the movie (encrypted) over the provider's distribution network to the subscriber's set-top box. The set-top box invokes the DRM client and the client determines from the rules included with the DRM license associated with the movie whether the movie can be decrypted for viewing (e.g., the DRM client determines that the thirty-six hour time period is still in affect). If the movie can be decrypted, the DRM client facilitates the decryption of the movie using the decryption key included with the DRM license so that the subscriber can view the movie.

In particular situations, an individual may begin playing content and may wish to stop after only playing a portion of the content due to time constraints. For example, a subscriber may begin watching a movie the subscriber has rented through the subscriber's cable service provider and may decide to stop watching because the time becomes late and the subscriber needs to get up early in the morning to catch a flight for a two-day business trip. The subscriber may wish to watch the remainder of the movie at a later time. However the subscriber may only have twenty-four hours to watch the entire movie. In this particular instance, the subscriber may wish to transfer the licensing rights to another device (such as his wireless device) so that he may finish watching the movie while on his business trip. Therefore, a need exists that allows an individual to transfer licensing rights for media content (e.g., the movie) associated with a first device on a first distribution platform (e.g., the subscriber's set-top box on the subscriber's home video service provider system) to be associated with a second device on a second distribution platform (e.g., the subscriber's wireless device on the subscriber's wireless carrier network) so that the individual may view the remainder of the content on this second device.

SUMMARY OF THE INVENTION

Various embodiments of the present invention provide systems, methods, and computer-readable medium for transferring licensing rights for a user for a particular media content associated with a first device on a first distribution platform to be associated with a second device on a second distribution platform. With respect to particular embodiments, the systems may include at least one computer processor configured to: (a) receive a request to transfer the licensing rights associated with the first device on the first distribution platform to be associated with the second device on the second distribution platform for the particular media content, the request comprising user identification information for the user and licensing rights information on the licensing rights of the user for the particular media content; (b) contact the user to request the user to provide a user verification that the user would like to transfer the licensing rights associated with the first device on the first distribution platform to be associated with the second device on the second distribution platform for the particular media content; (c) receive the user verification from the user; (d) determine whether the user verification indicates the user would like to transfer the licensing rights; and (e) in response to the user verification indicating the user would like to transfer the licensing rights, send a message to the second distribution platform, the message comprising at least a portion of the licensing rights information on the licensing rights of the user for the particular media content, wherein the second distribution platform associates the licensing rights with the second device so that the user can play the particular media content on the second device.

Further, in various embodiments, the systems may also include memory and be configured to contact the user to request the user to provide a user verification by: (1) obtain a verification protocol stored in the memory based on the user identification information; (2) contact the user over a communication channel based on the verification protocol to request the user verification; and (3) receive the user verification from the user over the communication channel. In particular embodiments, the communication channel is a wireless carrier network.

In addition, in various embodiments, the request received to transfer the rights may further comprise platform identification information for the second distribution platform and the systems may be configured to: (a) identify the second distribution platform based at least in part on the platform identification information; (b) contact the second distribution platform to request the second distribution platform to provide a platform verification that the user has authorization to transfer the licensing rights to be associated with the second device on the second distribution platform for the particular media content; (c) receive the platform verification from the second distribution platform; (d) determine whether the platform verification indicates the user can transfer the licensing rights to be associated with the second device; and (e) in response to the platform verification indicating the user can transfer the licensing rights to be associated with the second device, perform the necessary functionality to transfer the rights.

Further, in various embodiments, the systems may be configured to receive use information from the second distribution platform, wherein the use information comprises information on the user's use of the particular media content on the second device, and, in response to receiving the use information, send a message to the first distribution platform comprising at least a portion of the use information, wherein upon receipt of the message, the first distribution platform adjusts the licensing rights for the user for the particular media content based at least in part on the portion of use information. While in other embodiments, the systems may be configured to receive a transfer indicator from the second distribution platform, the transfer indicator comprising an acknowledgement that the second distribution platform has successfully associated the licensing rights with the second device, and send a success message to the first distribution platform indicating the second distribution platform has successfully associated the licensing rights with the second device.

Further embodiments of the invention are directed to methods and computer-readable medium with steps and executable code with similar functionality as applied by various embodiments of the systems. Additional detail is provided below with regard to the various embodiments directed to these systems, methods, and computer-readable medium.

BRIEF DESCRIPTION OF THE DRAWINGS

Figure 1:
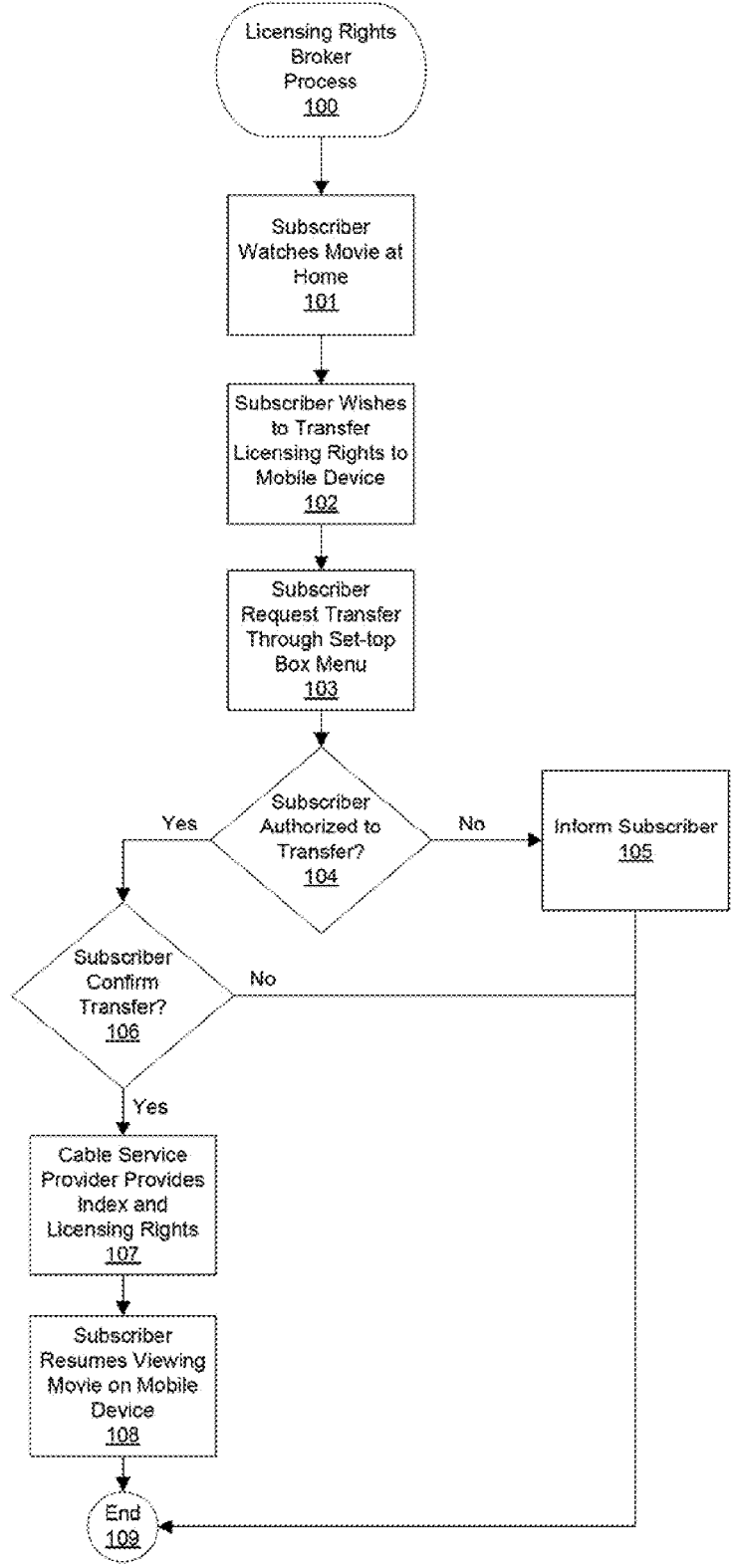

Having thus described various embodiments of the invention in general terms, reference will now be made to the accompanying drawings, which are not necessarily drawn to scale, and wherein:

FIG. 1 is a flow diagram illustrating the process for brokering licensing rights according to various embodiments of the invention.

Figure 2:
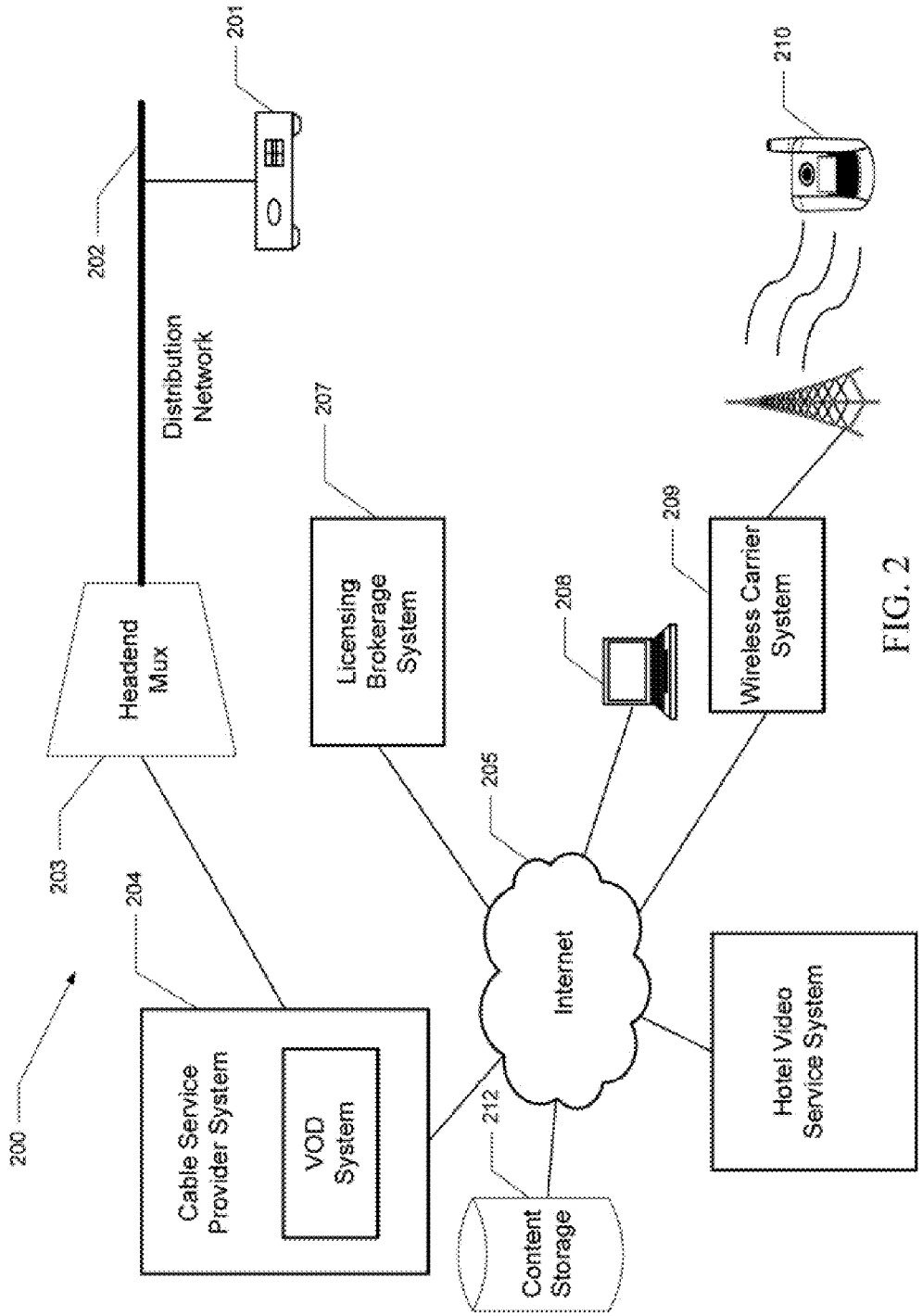

FIG. 2 is a schematic diagram illustrating a licensing brokerage environment that includes a licensing brokerage system according to various embodiments of the invention.

Figure 3:
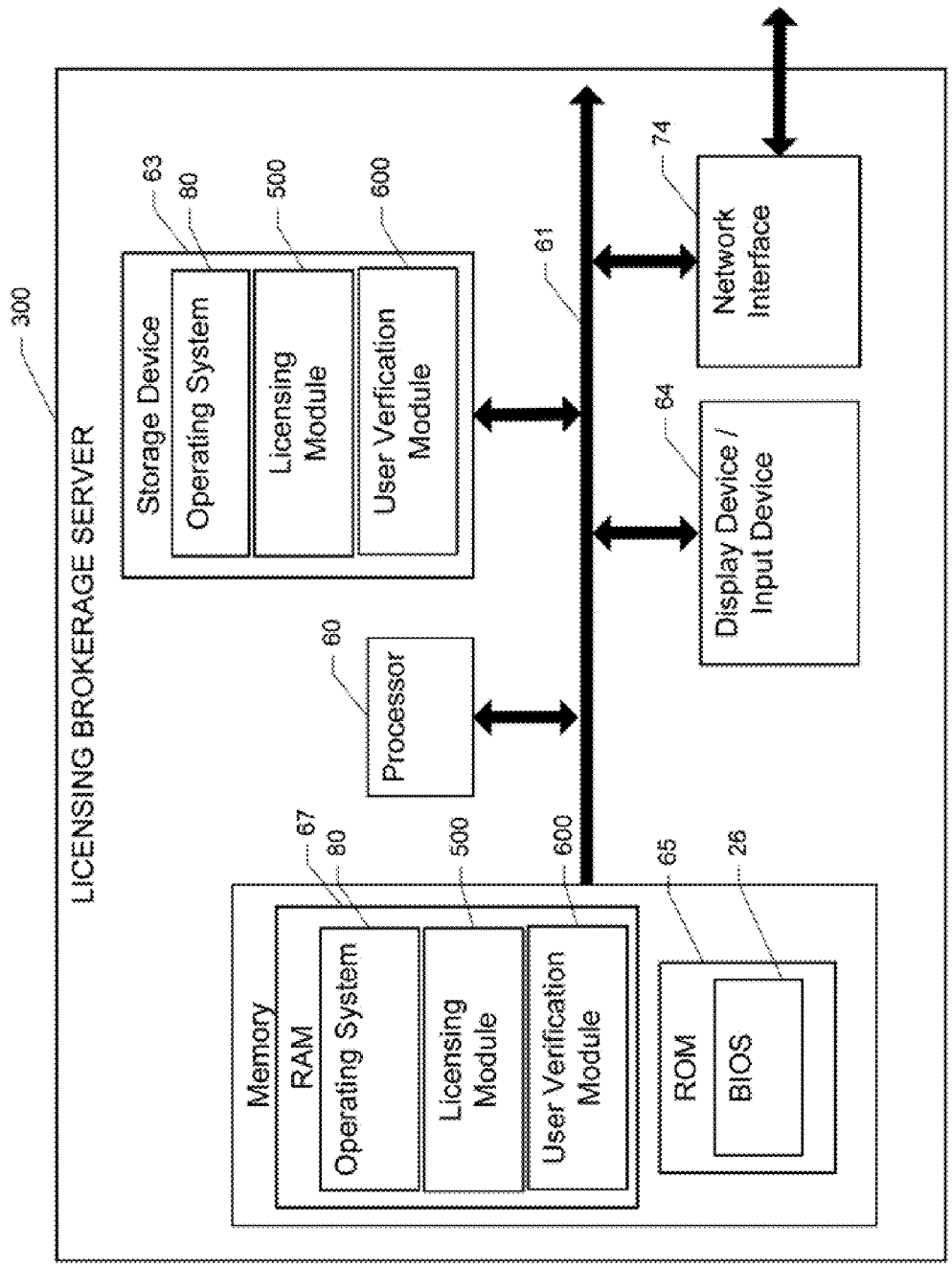

FIG. 3 is a schematic diagram illustrating a licensing brokerage server according to various embodiments of the invention.

Figure 4:
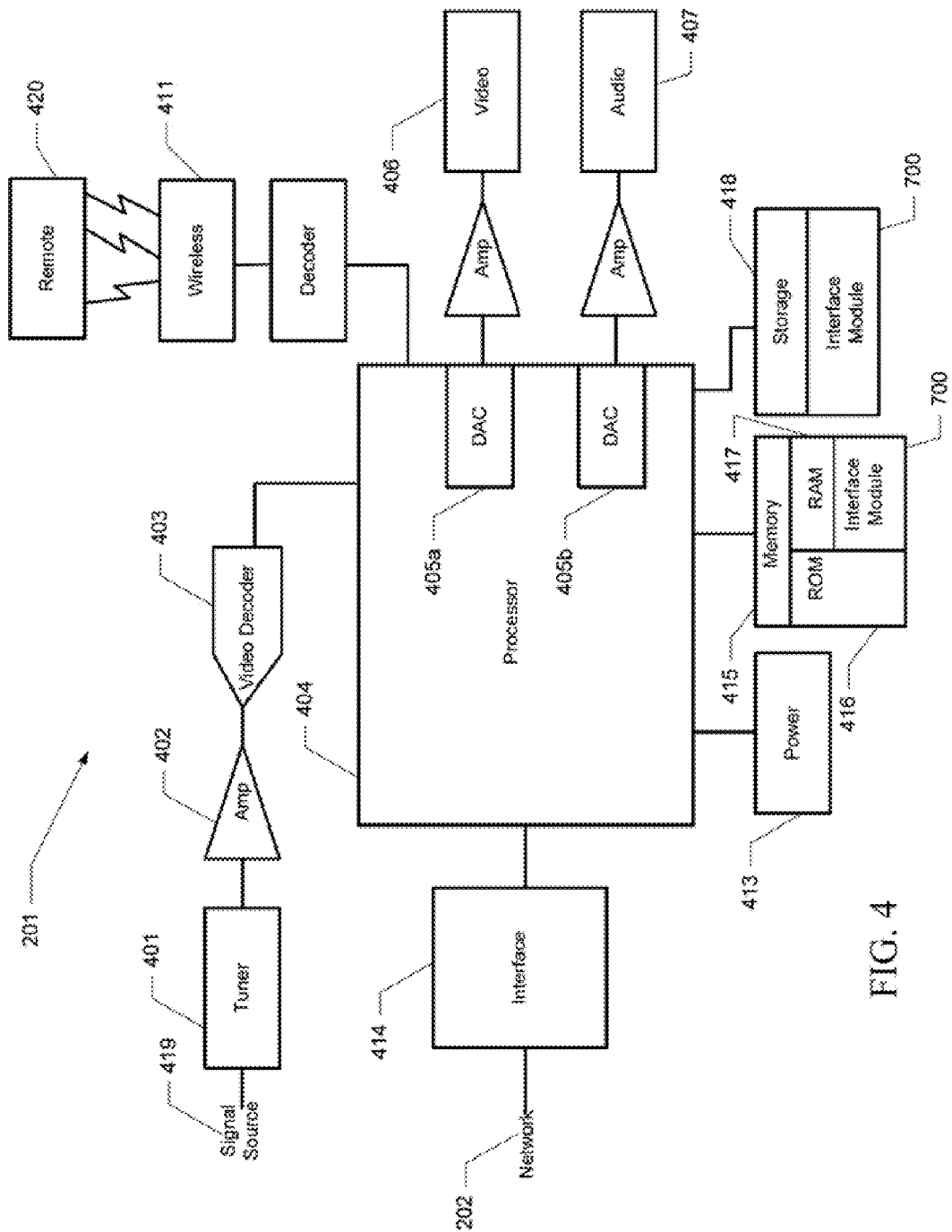

FIG. 4 is a schematic diagram illustrating a set-top box according to various embodiments of the invention.

Figure 5:
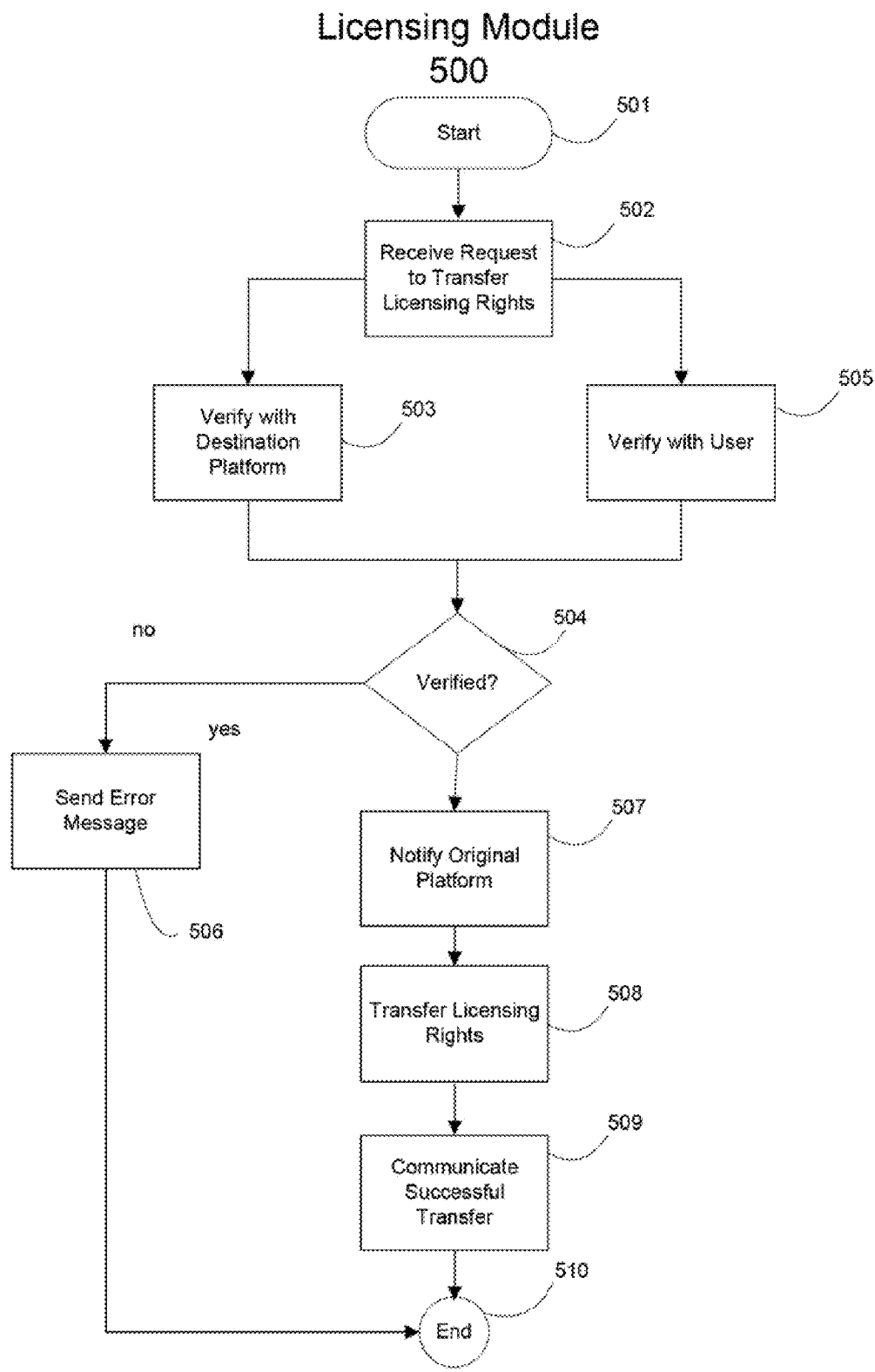

FIG. 5 is a flow diagram of a licensing module according to various embodiments of the invention.

Figure 6:
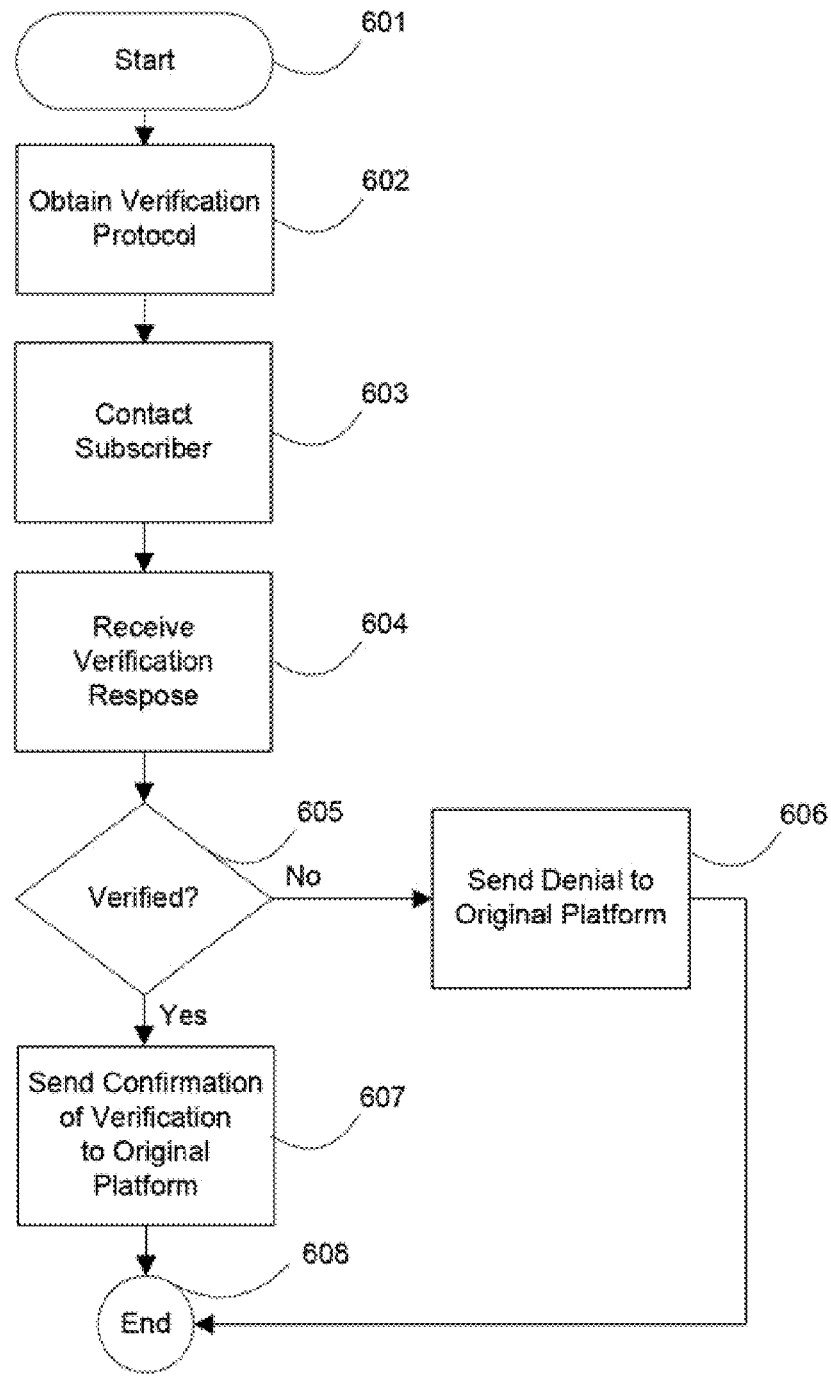

FIG. 6 is a flow diagram of a user verification module according to various embodiments of the invention.

Figure 7:
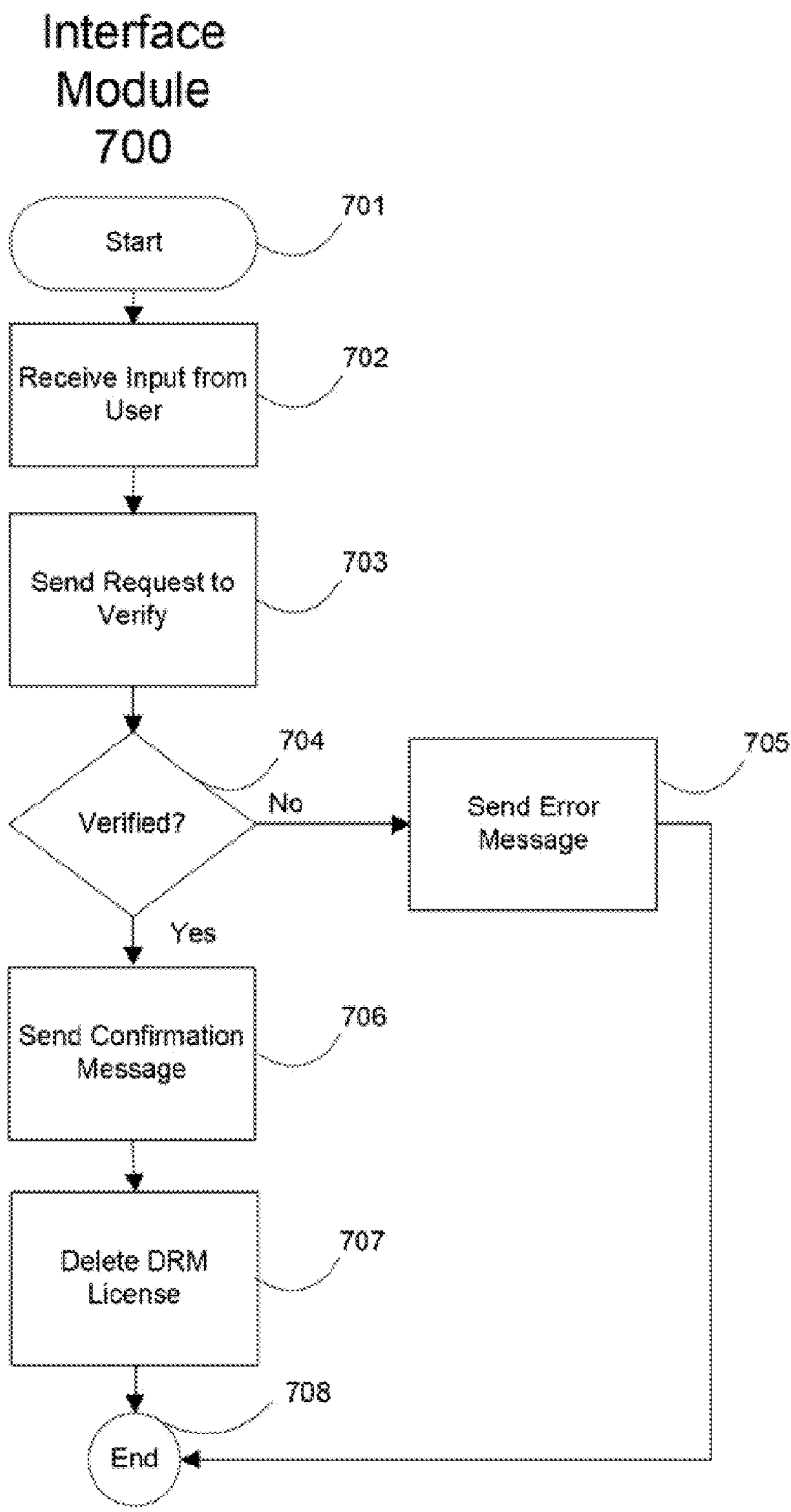

FIG. 7 is a flow diagram of an interface module according to various embodiments of the invention.

Figure 8:
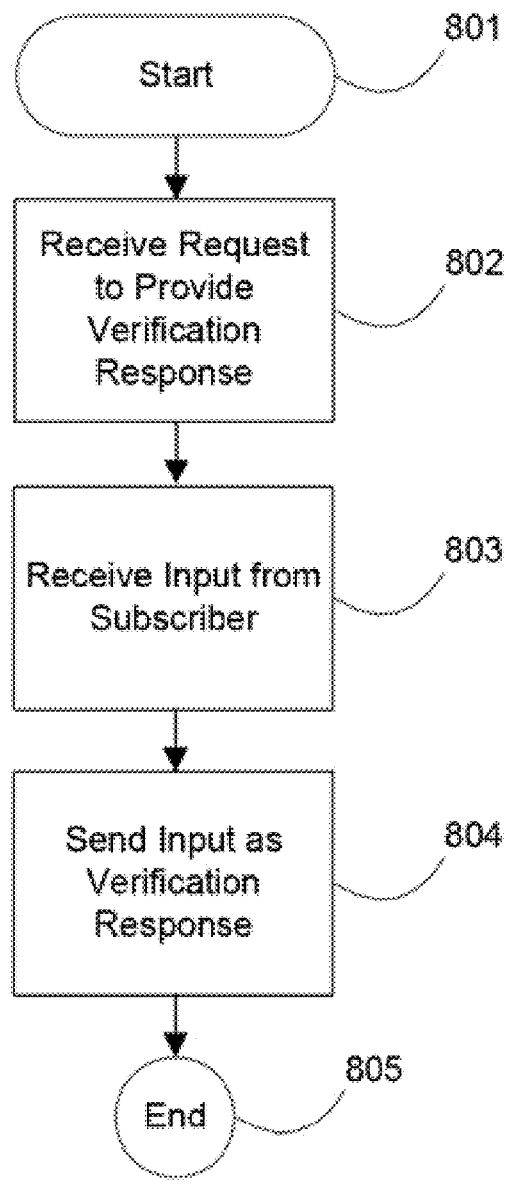

FIG. 8 is a flow diagram of a subscriber device module according to various embodiments of the invention.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Brief Overview of an Embodiment

Various embodiments of the present invention provide a mechanism by which an individual can have licensing rights associated with a first device and particular media content on a first distribution platform transferred so that the licensing rights are associated with a second device on a second distribution platform. As a result, the individual is able to play the media content on the second device. In various embodiments, the term "transfer" is used to mean communicating the licensing rights to the second distribution platform so that the second distribution platform can implement the licensing rights. In other embodiments, the term "transfer" is used to mean sending the second distribution platform the mechanism used to implement the licensing rights. Further, "media content" is a particular piece of media. For instance, content may be a television program, a movie, and/or a song. In addition, a "content distribution platform" is a particular system, network, device, and/or combination thereof used to distribute media content to individuals. Typically, a distribution platform is "closed" and is only accessible to a particular group of individuals. For instance, an example of a distribution network is a cable service provider's distribution system for delivering cable programming and services to the cable service provider's subscribers. The cable service provider's system may include one or more central locations from which programming is streamed to several subscribers (e.g., a headend), one or more distribution networks on which programming is streamed to subscribers, and one or more devices (e.g., set-top boxes) used by subscribers to receive the streamed programming and to access services provided by the cable service provider. In this particular example, the distribution network is typically closed and only the cable service provider's subscribers have access to the system.

Another example of a distribution platform is a wireless carrier network for providing wireless voice service to subscribers. The wireless carrier network may include the network for routing voice and data, the underlying systems that support the network, and the wireless devices used by subscribers of the carrier. In this particular example, the distribution platform may not be considered closed because in certain instances individuals who are not subscribers of the carrier may make use of the carrier's network (e.g., in instances when an individual is "roaming").

Further, another example of a distribution platform is a hotel's entertainment services system the hotel may provide to its guest on the television sets in the guest rooms. In this particular example, the distribution platform may be made up of the hotel's internal networking infrastructure so that particular services can be offered through the television sets in the guest rooms.

Furthermore, the term "provider" is used from this point forward to indicate a provider of distributed media content such as a cable service provider, a satellite TV provider, or a satellite radio provider. The term "subscriber" is used to describe a person (or entity) that subscribes to one or more services offered by a provider.

FIG. 1 illustrates one embodiment of a flow diagram of a process 100 for brokering licensing rights. For instance, a subscriber of a particular service provider may be watching a movie at home that he has rented through the service provider's VOD service, shown as Step 101. The subscriber has purchased licensing rights to view the movie within a twenty-four hour viewing window. In this particular case, the service provider's system has downloaded a DRM license to subscriber's set-top box to enforce the twenty-four hour viewing window and to provide one or more decryption keys to decrypt the movie stream. Midway through the viewing of the movie, the subscriber decides to transfer the movie to his mobile device to watch the remainder of the movie and, initiates the transfer in the prescribed manner for the service provider's system, shown as Step 102. (In a particular embodiment, transferring the movie involves communicating the licensing rights the subscriber has with respect to the movie on his home service provider to his wireless carrier so that the wireless carrier can implement the rights on the carrier's platform.) For instance, the subscriber uses a menu provided through the subscriber's set-top box to request the transfer, shown as Step 103. In particular embodiments, the subscriber may be required to provide an identifier for the device he would like to transfer the licensing rights for the movie to, such as the phone number for his wireless device. In other embodiments, the subscriber may setup a subscriber profile ahead of time that has a listing of devices the subscriber may have the licensing rights transferred to. Thus, in these particular embodiments, the menu may provide a list of devices on screen that the subscriber can select from. This profile may be stored directly on the subscriber's set-top box, stored at a central location on the service provider's system such as at the headend, and/or stored at a location external to the service provider's system.

An advantage of "registering" devices ahead of time is that, in various embodiments, these devices (and the supporting content distribution platforms) may be verified as capable of streaming the movie. This pre-verification may reduce the amount of time required to transfer the licensing rights for the movie because in many instances the service provider will not need to go through the time and process of verifying that the licensing rights can be transferred to the selected device at the time of transferring the rights.

In particular embodiments, a licensing broker is utilized to facilitate the transfer of licensing rights for the media content from a first device in a first content distribution platform to a second device in a second content distribution platform. In these particular embodiments, the licensing broker is responsible for communicating what licensing rights are available to the subscriber between the first content distribution platform and the second content distribution platform. Thus, the licensing broker enters into business relationships with various service providers. For instance, in the example above, the licensing broker enters into business relationships with the subscriber's cable service provider and wireless carrier. Further, in these particular embodiments, the licensing broker may facilitate the brokering of licensing rights between the service providers by providing the necessary system components (e.g., hardware and software) and communication channels. For instance, in the example, the licensing broker may provide the cable service provider an application to install within its VOD service so that the subscriber can request to have the licensing rights associated with the movie transferred from the cable service provider to the wireless carrier. Further detail for the necessary components and communication channels are provided below in FIG. 2 according to a particular embodiment of the invention.

In addition, in various embodiments, the licensing broker may enter into business relationships with subscribers of various content providers. In one embodiment, these subscribers enroll for service directly with the licensing broker and provide the necessary information to facilitate the service. In another embodiment, the subscribers enroll for the service through their individual content providers.

Furthermore, it should be apparent to those of ordinary skill in the art that in various embodiments the service providers can facilitate the brokering of licensing rights among themselves without having to use the licensing broker. Thus, in these particular embodiments, the content service providers set up business relationships with each other and with other parties and set up the necessary system components themselves.

Returning to Step 103 in FIG. 1, in the example, the subscriber may enter his request to transfer the licensing rights for the movie to his wireless device by utilizing one or more menus provided by his set-top box and various input devices such as a remote control or a keyboard in communication with the set-top box. In response, the set-top box directs the request over the cable service provider's distribution network to the headend associated with the network. In turn, the headend may direct a request to the licensing broker to determine whether the subscriber has authorization to transfer the licensing rights for the movie to his wireless device. In various embodiments, the cable service provider's system is in communication with the licensing broker's system over the Internet and the request is routed over the Internet to the licensing broker's system. The request may include information such as identification information for the subscriber, identification information for particular media content (e.g., movie), information on the subscriber's wireless carrier and/or wireless device, and/or information on the licensing rights the subscriber has in the cable service provider's system with respect to the particular media content.

In Step 104, the licensing broker's system verifies the subscriber has authorization to transfer the licensing rights for the movie to the subscriber's wireless device. This step may be carried out in different ways according to various embodiments. For instance, in one embodiment, the licensing broker's system stores information about the subscriber that is used to determine whether the subscriber has authorization to make the transfer. In one example, the subscriber registers directly with the licensing broker and during the registration process provides the information necessary to register devices and/or content distribution platforms that may be used in transferring media content (e.g., transferring licensing rights). Thus, in this example, the licensing broker's system retrieves the stored information for the subscriber and compares the information with the identification information received along with the request from the cable service provider's system to determine whether the subscriber has authorization to make the transfer.

In another embodiment, the subscriber's cable service provider may store similar information and make the determination without having to contact the licensing broker (or the wireless carrier). Further, in another embodiment, the licensing broker's system (or the cable service provider's system) may contact the wireless carrier's system to determine whether the subscriber may transfer the licensing rights for the movie to his wireless device. This may be more desirable in some instances because the wireless carrier can determine whether the subscriber is a customer in good-standing with the carrier before authorizing the transfer.

Further, in various embodiments, the licensing broker (or cable service provider) may also verify, if needed, that the selected device (e.g., the subscriber's wireless device) and/or destination content distribution platform (e.g., the subscriber's wireless carrier's system) have the necessary capabilities to facilitate the transfer. This step may entail the licensing broker confirming that the wireless provider's system has the movie available and/or has the capability to stream the movie to the subscriber's wireless device. In certain embodiments, information detailing the wireless carrier's capabilities may be stored by the licensing broker or the cable service provider. While in other embodiments, the wireless carrier may be contacted by the licensing broker or the cable service provider to obtain this information.

If the licensing broker determines that the subscriber does not have the authorization to transfer the licensing rights for the movie to his wireless device, the licensing broker facilitates informing the subscriber, shown as Step 105. For instance, in one embodiment, the licensing broker's system sends a message to the cable service provider's system and the cable service provider's system facilitates a message appearing on the subscriber's television that indicates that the licensing rights for the movie cannot be transferred. At this point, the subscriber may be asked to provide an alternative device.

Further, in various embodiments, the subscriber confirms transferring the licensing rights for the movie to his wireless device, shown as Step 106. In particular embodiments, the cable service provider may simply ask the subscriber to confirm transfer via a screen (e.g., pop-up) that appears on the subscriber's television and requests the subscriber to select a particular button on the subscriber's remote control to confirm the transfer. In other embodiments, the licensing broker's system (or cable service provider's system) may obtain a verification protocol for the subscriber from stored information. In these particular embodiments, the stored information indicates a mechanism for contacting the subscriber to request the subscriber to confirm that he has actually requested the licensing rights to be transferred to his wireless device. For example, in one embodiment, the stored information indicates that the subscriber should be contacted via short message service (SMS). Thus, the licensing broker's system initiates the verification protocol by communicating with the subscriber's wireless provider's system to send the subscriber a message to his wireless device that requests a response from the subscriber. In other embodiments, the stored information indicates to send the subscriber an email or to contact the subscriber via a phone call. Thus, in these particular embodiments, the licensing broker's system sends the subscriber an email or places a phone call to initiate the verification protocol.

The message sent to the subscriber's wireless device may request different information according to various embodiments. For instance, the message may simply ask the subscriber to confirm that he has requested the transfer of the licensing rights for the movie. However, in other embodiments, the message may involve requesting more detailed information to verify that the subscriber has actually requested the transfer. For example, in one embodiment, the message may request the subscriber to respond with a username and password to verify the subscriber has made the request. In another example, the subscriber may have included along with the request sent from the set-top box an answer to a question or a phrase. For instance, the subscriber may have typed in the phrase, "going on a business trip." In this example, the message may request the subscriber to re-enter this phrase in order to verify the subscriber has actually requested the transfer.

Thus, in various embodiments, the subscriber responds to the message and information associated with the subscriber's response is routed through the subscriber's wireless provider's system to the licensing broker's system (or, in alternative embodiments, directly to the subscriber's cable service provider's system). The licensing broker's system determines from the subscriber's response whether the transfer has been verified by the subscriber. In one embodiment, this entails the content brokerage provider's system verifying the information associated with the subscriber's response and confirming the information based on the information stored for the subscriber and/or the identification information received along with the request from the cable service provider's system.

In alternative embodiments, the cable service provider's system receives information received in the response from the subscriber and confirms the transfer. Thus, in these particular embodiments, the cable service provider's system sends a confirmation to the licensing broker's system that the subscriber has confirmed the transfer.

If the licensing broker's system determines that the subscriber has verified transferring the licensing rights for the movie to his wireless device, in various embodiments, the licensing broker's system sends a confirmation to the cable service provider's system. In turn, the cable service provider's system may provide the subscriber with confirmation that his request has been verified by sending a message to the set-top box.

If the cable service provider has not done so previously, in Step 107, the cable service provider's system sends the licensing broker's system information on the licensing rights the subscriber has with regard to the movie on the cable service provider's system. As with previous communications, the cable service provider's system may send a message over the Internet to the licensing broker's system in various embodiments. In response, the licensing broker's system conveys the subscriber's licensing rights to the wireless carrier. Thus, in the example, the licensing broker's system sends a message to the wireless carrier's system that indicates the time the subscriber has remaining to view the movie. The wireless carrier's system then constructs a license for the subscriber to use in viewing the movie on the subscriber's wireless device. For instance, in one embodiment, the wireless carrier's system creates a DRM license and downloads the license to the subscriber's wireless device. In particular embodiments, the cable service provider may delete the subscriber's licensing rights on the cable service provider's system once the transfer has occurred.

In addition, in various embodiments, the cable service provider's system may also provide an index of the location in the movie where the subscriber stopped watching. This index may then be forwarded to the wireless carrier's system so that the movie can be streamed to the subscriber's wireless device and started at the place in the movie in which the subscriber stopped watching on his home cable. Thus, in various embodiments, the wireless carrier's system obtains the movie to stream to the subscriber's wireless device through its normal channels. For instance, the wireless carrier's system may have access to one or more media content libraries that are either internal or external to the wireless carrier's system. As a result of the process 100, the subscriber is able to resume viewing the movie on his wireless device, shown as Step 108. Further, as a consequence of the process 100, the subscriber is able to make full use of the license he purchased for the movie from his home cable service provider.

In addition, in various embodiments, the process 100 may result in a charge to the subscriber's wireless bill and/or to his cable bill for executing the transfer of the licensing rights. Also, in particular embodiments, the subscriber may receive a bill directly from the licensing broker for assisting in the transfer of the licensing rights. Further, in particular embodiments, payment arrangements may exist between the various parties (e.g., cable service provider, wireless carrier, and licensing broker) for conducting such transactions.

It should be apparent to one of ordinary skill in the art that the above-described process 100 is provided as an example only and that the process 100 can be used in various other situations. For example, the distribution platforms exchanging licensing rights may be satellite radio providers, hotel entertainment service providers, web content providers, etc. Thus, the description of the process 100 provided above is for illustrative purposes only and should not be construed to limit the scope of the invention.

System Architecture

A licensing brokerage environment 200 according to various embodiments of the invention is shown in FIG. 2. For instance, the environment 200 may be configured to allow different content distribution platforms providing media content to various subscribers to broker licensing rights for the media content. Other configurations of the licensing brokerage environment 200 may be utilized in various embodiments. Therefore, the environment 200 depicted in FIG. 2 is provided for illustrative purposes only and should not be construed to limit the scope of the claimed invention.

As may be understood from this figure, in various embodiments, the environment 200 includes more than one content distribution platform. For instance, the particular embodiment shown in FIG. 2 includes a cable service provider system 204, a hotel video service system 206, and a wireless carrier system 209. Further, the particular embodiment shown in FIG. 2 includes a headend 203 and a distribution network 202 that includes one or more set-top boxes (the figure displays one such set-top box 201). These components 201, 202, 203 are in communication with the cable service provider system 204 and constitute part of the cable provider's distribution platform. In general, the set-top box 201 is a device that is used by a subscriber to receive digital cable signals for television and is configured to send data to the headend 203 of the cable service provider. For example, the set-top box 201 may be a device, such as a personal video recorder (PVR) provided by a cable company. The PVR receives the digital cable signal and feeds the signal into an individual's television set so that the individual can view the cable provider's cable television programming.

As shown, in various embodiments, the set-top box 201 communicates with the headend 203 of the cable service provider over the distribution network 202. The headend 203 routes messages (e.g. subscriber requests) received from the set-top box 201 to various components of the cable service provider system 204 and streams content (e.g., programs and movies) to the set-top box 201. For instance, in one embodiment, the headend 203 receives input from the user via the set-top box 201, interprets the input, and routes the input to the appropriate component of the cable service provider system 204, such as the VOD system.

Further, in various embodiments, the environment 200 includes a licensing brokerage system 207. As is described in further detail below, in particular embodiments, the licensing brokerage system 207 serves an intermediary that coordinates and facilitates the brokering of licensing rights and/or payment among content distribution platforms (e.g., the cable service provider, the hotel video service, and the wireless carrier).

In addition, in various embodiments, the cable service provider system 204, the hotel video service system 206, the wireless carrier system 209, and the licensing brokerage system 207 are connected over a communication channel. For instance, in FIG. 2, the systems 204, 206, 209, 207 are connected over the Internet 205. Further, in various embodiments, the systems 204, 206, 209, 207 may make use of security measures such as a virtual private network (VPN) or encryption to communicate. However, it should be obvious to those of ordinary skill in the art, in light of this disclosure, that the systems 204, 206, 209, 207 may use other channels of communication in other embodiments, such as a local area network (LAN), a wide area network (WAN), or a wireless network.

As depicted in FIG. 2, the wireless provider system 209 may also be utilized in various embodiments during the verification process to verify that a particular subscriber of a content distribution platform has requested transfer of media content from one platform to another platform (e.g., has requested transfer of licensing rights associated with media content from one platform to another platform). For instance, in one embodiment, the subscriber transmits a verification response via the subscriber's wireless device 210 (such as a cell phone) and the wireless provider system 209 forwards the response to the licensing brokerage system 207. In other embodiments, the subscriber's wireless device 210 may communicate directly with the set-top box 201 to initiate the verification process, such as, for example, through infrared or blue tooth technology.

However, in other embodiments, subscribers may send verification responses via other mechanisms. For example, in one embodiment, a subscriber may send the licensing brokerage system 207 or other content distribution platform a verification response from a personal computer 208 or laptop computer over the Internet 209. For instance, the licensing brokerage system 207 or a content distribution platform may host a website and the subscriber logs onto the website to register a response or the licensing brokerage system 207 or the content distribution platform sends the subscriber an email, to which the subscriber replies to send a response. Those of ordinary skill in the art can envision numerous ways a subscriber can facilitate the verification response in light of this disclosure.

Exemplary Licensing Brokerage System

The licensing brokerage system 207 depicted in FIG. 2 may be comprised of several components according to various embodiments. For instance, in one embodiment, the system 207 may comprise one or more servers and one or more storage medium. In particular, FIG. 3 shows a schematic diagram of a server 300 that may reside in the licensing brokerage system 207 according to one embodiment of the invention. However, it should be understood that the licensing brokerage system 207 does not necessarily need to include only a single server. For instance, in various embodiments, the system 207 may include one or more servers executing one or more software applications. Thus, the server 300 shown in FIG. 3 is provided for illustrative purposes only and should not be construed to limit the scope of the invention.

In FIG. 3, the server 300 includes a processor 60 that communicates with other elements within the server 300 via a system interface or bus 61. Also connected to the server 300 is a display device/input device 64 for receiving and displaying data that may be used by administrative personnel. This display device/input device 64 may be, for example, a keyboard or pointing device that is used in combination with a monitor. The server 300 further includes memory 66, which preferably includes both read only memory (ROM) 65 and random access memory (RAM) 67. The server's ROM 65 is used to store a basic input/output system 26 (BIOS), containing the basic routines that help to transfer information between elements within the server 300. Alternatively, the server 300 can operate on one computer or on multiple computers that are networked together.

In addition, the server 300 includes at least one storage device 63, such as a hard disk drive, a floppy disk drive, a CD Rom drive, flash drive, or optical disk drive, for storing information on various computer-readable media, such as a hard disk, a removable magnetic disk, or a CD-ROM disk. As will be appreciated by one of ordinary skill in the art, each of these storage devices 63 is connected to the server bus 61 by an appropriate interface. The storage devices 63 and their associated computer-readable media provide nonvolatile storage for the server 300. It is important to note that the computer-readable media described above could be replaced by any other type of computer-readable media known in the art. Such media include, for example, magnetic cassettes, flash memory cards, digital video disks, and Bernoulli cartridges.

A number of program modules (e.g., set of computer program instructions) may be stored by the various storage devices and within RAM 67. For example, as shown in FIG. 3, program modules of the server 300 may include an operating system 80, a licensing module 500, and a user verification module 600. These modules 500, 600 may be used to control certain aspects of the operation of the server 300, as is described in more detail below, with the assistance of the processor 60 and an operating system 80.

Also located within the server 300 is a network interface 74, for interfacing and communicating with other elements of one or more networks (such as the network 205 described in the content brokerage environment 200 depicted in FIG. 2.) It will be appreciated by one of ordinary skill in the art that one or more of the server's 300 components may be located geographically remotely from other server 300 components. Furthermore, one or more of the components may be combined, and additional components performing functions described herein may be included in the server 300.

Exemplary Set-top Box

FIG. 4 shows a schematic diagram of a set-top box 201 according to one embodiment of the invention. The particular set-top box 201 depicted in FIG. 4 is configured to receive a digital signal from a cable provider or a satellite TV provider and to convert the signal into audiovisual content that is typically displayed on a television.

The particular embodiment of the set-top box 201 shown in FIG. 4 includes a processor 404 and storage 418, such as a hard disk drive and/or a flash drive, on which audiovisual data may be recorded and stored by the processor 404. In addition, the set-top box 201 further includes memory 415 composed of both read only memory (ROM) 416 and random access memory (RAM) 417.

The set-top box 201 further includes a tuner 401 configured to receive the incoming source signal 419. The tuner 401 sends the source signal 419 through an amplifier 402 and a video decoder 403 configured to translate the encoded source signal 419 into its original format. The video decoder 403 directs the translated source signal 419 to the processor 404.

In various embodiments, the processor 404 may also include a digital-to-analog converter (DAC) 405a, 405b configured to convert the translated source signal 419 from a digital signal to an analog signal if the television will only read an analog signal. Furthermore, the processor 404 is configured to feed the translated signal to the video and audio outputs 406, 407 of the set-top box 201 that are connected to the television.

In addition, the set-top box 201 may also include a wireless interface 411 that is configured to receive commands (and/or input) from a viewer via transmission from a remote control 420. The remote control 420 may transmit such commands using any number of transmitters, such as a radio frequency transmitter, a supersonic transmitter, or an optical transmitter. Further, the remote control 420 may be configured with cellphone-spelling style features so that a subscriber may enter text.

A number of program modules (such as an interface module 700) may also be stored within the storage 418 and/or within the RAM 217 of the set-top box 201. This module 700 may be used to control certain aspects of the operation of the set-top box 201, as is described in more detail below, with the assistance of the processor 404.

Also located within the set-top box 201 is an interface 414, for interfacing and communicating with other elements of a network (such as the headend 203 in communication with the distribution network 202 described in the environment 200 depicted in FIG. 2.) It will be appreciated by one of ordinary skill in the art that one or more of the components described to reside in the set-top box 201 may be located geographically remotely from the set-top box 201. Furthermore, one or more of the components may be combined, and additional components performing functions described herein may also be included in the set-top box 201.

Additional Exemplary Components

The plurality of additional systems 204, 206, 209 may each include components and functionality similar to that of the licensing brokerage server 300. For example, in one embodiment, each of the entities may include: (1) a processor that communicates with other elements via a system interface or bus; (2) a display device/input device; (3) memory including both ROM and RAM; (4) a storage device; and (5) a network interface. These architectures are provided for exemplary purposes only and are not limiting to the various embodiments. The term "server" is used generically to refer to any computer, computing device, desktop, notebook or laptop, distributed system, server, gateway, switch, or other processing device adapted to perform the functions described herein.

Exemplary System Operation

As mentioned above, the environment 200 according to various embodiments facilitates the transferring of licensing rights for a user and particular media content associated with a first device on a first content distribution platform to be associated with a second device on a second content distribution platform. In various embodiments, the environment 200 includes a licensing brokerage system 207. In particular embodiments, this system 207 serves as an intermediary between various content distribution platforms and facilitates the brokering of licensing rights between the platforms. Further, in particular embodiments, the licensing brokerage system 207 includes a licensing module 500 and/or a user verification module 600. These modules 500, 600 are configured to control certain aspects of the brokering process as described below.

It should be understood by those of ordinary skill in the art that various embodiments do not utilize the licensing brokerage system 207. For instance, in particular embodiments, the content distribution platforms may broker content between themselves without the use of the licensing broker (or other third party). In these particular embodiments, the licensing module 500 and/or user verification module 600 may be located within the content distribution platforms.

In addition, in various embodiments, one or more devices (such as a set-top box 201) may include an interface module 700. This module 700 is configured to control certain aspects of requesting a transfer of particular media content to another content distribution platform as described below. Further, various embodiments make use of devices to facilitate verification that a subscriber would like to transfer media content (e.g., transfer the licensing rights of media content) from one platform to another. In particular embodiments, these devices may include a module 800 that is configured to present the subscriber with verification information and receive verification input from the subscriber. These modules 500, 600, 700, 800 are described in more detail below.

Business Relationships

As previously mentioned, in various embodiments, the licensing broker enters into business relationships with various content service providers (e.g., the cable service provider, the hotel video service provider, and the wireless carrier) to facilitate the brokering of licensing rights between service providers. The business relationships may establish such elements as pricing for brokering licensing rights, how, how much, and when are the parties paid after a brokering transaction, and protocols for various aspects of the brokering process, such as communication channels and/or payment methods. Further, the licensing broker may provide each content distribution platform with various components that may be needed to facilitate the brokerage system. For instance, in one embodiment, the licensing broker provides each cable/satellite television service provider an application to install within its VOD service so that subscribers can request to view VOD programs and have the programs (e.g., licensing rights for the programs) transferred to another content distribution platform. Further, in various embodiments, the licensing broker provides each content distribution platform with the necessary software (and/or hardware) to facilitate communication with the licensing broker. As is described in more detail below, in various embodiments, the licensing broker system 207, the cable service provider system 204, the hotel video service system 206, and the wireless carrier system 209 exchange information among the systems 204, 206, 207, 209 during the brokering process.

In addition, in various embodiments, the licensing broker may enter into business agreements with other entities to facilitate additional aspects of the brokering process that do not directly involve the exchange of licensing rights. For instance, in one embodiment, the licensing broker may enter into business relationships with wireless providers to facilitate communication directly with subscribers. In these particular embodiments, the licensing broker may provide these entities with components (such as software and/or hardware) to aid in the brokering process. For example, as is described in greater detail below, the licensing broker may provide wireless providers with an application that the wireless providers provide to their subscribers to install on their wireless devices that is used during verification of a subscriber's request to transfer licensing rights for media content during the brokering process.

Further, in various embodiments, the licensing broker may enter into business relationships with subscribers of various content distribution platforms. In one embodiment, these subscribers enroll for service directly with the licensing broker and provide the necessary information to facilitate the service. For instance, the subscribers provide information necessary for obtaining verification from subscribers during brokering transactions. In another embodiment, the subscribers enroll for the service through their individual content distribution platforms.

Furthermore, it should be apparent to those of ordinary skill in the art in light of this disclosure that in various embodiments the content distribution platforms can facilitate the brokering of licensing rights among themselves without having to use the licensing broker. Thus, in these particular embodiments, the content distribution platforms set up business relationships with each other and provide the necessary system components themselves.

In addition, portions of the contractual agreements set up among the parties (e.g., plurality of content distribution platforms and the licensing broker) may be directed to payment of fees to various parties for performing tasks associated with transferring licensing rights among the various content distribution platforms. For instance, in various embodiments, the licensing broker is paid a fee for facilitating the transfer of licensing rights from a first content distribution platform to a second content distribution platform. In particular embodiments, this fee may be paid by the first content distribution platform and/or the second content distribution platform. In other embodiments, the subscriber requesting the transfer of licensing rights may pay the fee for the transfer transaction. In addition, in various embodiments, a portion of the fee is paid to the wireless provider for facilitating the verification protocol (as further detailed below).

In particular instances, the licensing broker may collect the fee and may pay portions of the fee to various parties, such as the destination content distribution platforms and/or the wireless provider. In particular embodiments, the licensing brokerage system 207 facilitates payment to these various parties. For example, in one embodiment, the licensing brokerage system 207 records the licensing rights transfers that occur with various subscribers and directly bills the subscribers periodically (such as monthly) for these transfers. A subscriber sends in a payment to the licensing broker and the licensing broker calculates the portions of the fee to be paid to the various parties. In various embodiments, this may be automated so that the licensing brokerage system 207 is further configured to electronically send each party's portion of the collected fees to the party's corresponding systems and/or banking systems.

Further, in various embodiments, the licensing brokerage system 207 may simply record all of the transfers that occur and periodically send reports to the Various parties involved in the transfers. The parties may then use these reports to determine what fee is due to what parties involved in the transfers. For instance, the licensing brokerage system 207 sends the cable service provider system 204 a report at the end of each month and the report lists the transfers in which subscribers of the cable service provider had licensing rights transferred to and from various content distribution platforms. The cable service provider then contacts the various content distribution platforms and requests fees, as appropriate, from these platforms. For example, a subscriber of the cable service provider may have purchased licensing rights to view a movie on his wireless device from his wireless carrier and may have had the licensing rights transferred to the cable service provider's system 204. At the time of purchase, the wireless carrier may have charged the subscriber a fee for the movie (e.g., $3.99). This particular transfer may appear on the cable provider's monthly report and, as a result, the cable service provider contacts the wireless carrier requesting at least a portion of the fee collected by the wireless carrier from the subscriber.

Licensing Module

As previously discussed, in various embodiments, the licensing broker system 207 may include a licensing module 500 that is configured to facilitate certain aspects of brokering licensing rights between content distribution platforms. However, in other embodiments, the content distribution platform's systems, themselves, may include the licensing module 500.

The functionality of the licensing module 500 is explained below using a specific example. However, it should be understood that this example is provided for clarification purposes only and should not be construed to limit the scope of the claimed invention. For instance, a subscriber of a cable service provider may be away from home on a business trip in Los Angeles, Calif. While in Los Angeles, the subscriber may wish to view a movie in his hotel room through the hotel's video service. The subscriber selects the desired movie through the service and begins to watch the movie. The hotel video service system 206 receives the request from the subscriber and downloads a DRM license to the subscriber's television (or associated set-top box) in the subscriber's hotel room. The DRM license includes a variable (e.g., rule) informing the DRM client on the subscriber's television (or set-top box) that the subscriber can view the movie one-time and one or more decryption keys to decrypt the encrypted movie streamed to the subscriber's television in his hotel room. Further, the hotel video service system 206 informs the hotel's billing system of the subscriber's purchase and the hotel charges the subscriber an additional $5.99 for the movie on his bill for the hotel room.

About half-way through the movie the subscriber becomes tired and decides to go to sleep instead of finishing the movie. The subscriber has an early flight the next morning back home so the subscriber will not have an opportunity to finish watching the movie in the morning. However, the subscriber would like to finish watching the movie once he gets home because he has already been charged for requesting the movie.

In various embodiments, the subscriber pauses watching the movie and accesses the hotel's video service. The video service provides a menu choice for transferring the movie (e.g., licensing rights for the movie) to another content distribution platform (e.g., to the subscriber's cable service provider). Thus, the subscriber selects the menu option (e.g., licensing broker function) for transferring the movie.

Still, in other embodiments, the subscriber may not initiate the licensing broker function through the hotel's video service. For example, in other embodiments, the subscriber may initiate the process by placing a call with the licensing broker or by accessing a website provided by the licensing broker over a personal computer 208.

In various embodiments, the subscriber selects the licensing broker function and is prompted for identification information. For instance, in one embodiment, the subscriber is prompted for information such as the subscriber's home cable service provider and account number or other unique identifiers (such as username and password). In another embodiment, the subscriber may wish to transfer the licensing rights for the movie to his wireless device. In this instance, the subscriber may be prompted to provide his phone number along with the name of his wireless carrier so that the transfer process can be performed. Further, in another embodiment, the subscriber may be provided with a list of content distribution platforms to choose from. Thus, in this particular embodiment, the hotel can control which content distribution platforms the hotels conducts brokerage transactions with.

As previously described, in various embodiments, the hotel video service system 206 is in communication with the licensing brokerage system 207. For example, the two systems 206, 207 communicate over the Internet 205. Thus, in response to the subscriber entering the information, the hotel video service system 206 sends a message communicating the request that includes at least a part of the information entered by the subscriber over the Internet 205 to the licensing brokerage system 207.

The licensing brokerage system 207 receives the message and initiates the process for fulfilling the subscriber's request to transfer the licensing rights for the movie to the subscriber's home cable service provider. Accordingly, FIG. 5 illustrates a flow diagram of the licensing module 500 residing in the licensing brokerage system 207 according to various embodiments. This flow diagram may correspond to the steps carried out by the processor 60 in the licensing brokerage server 300 shown in FIG. 3 as it executes the module 500 in the server's RAM memory 67 according to various embodiments.

Thus, as a result, the licensing module 500 receives the subscriber's request to transfer the licensing rights for the movie to the subscriber's home cable service provider, shown as Step 502. In particular embodiments, the licensing module 500 may actually transfer the licensing rights mechanism use for the movie in the hotel video service system 206 to the subscriber's video service provider system 204. While in other embodiments, the licensing module 500 communicates the licensing rights the subscriber has for the movie from the hotel video service system 206 to the subscriber's video service provider system 204.

In various embodiments, the information received in the message sent from the first content distribution platform includes identification for the second content distribution platform. For instance, in the example, the message received from the hotel video service system 206 to transfer the movie (e.g., licensing rights for the movie) to the subscriber's cable service provider system 204 includes information identifying the cable service provider. Thus, in Step 503, the licensing module 500 verifies that the subscriber has authorization to transfer the licensing rights for the movie to the cable service provider system 204 and/or verifies the cable service provider system 204 has the capability to accept the transfer of licensing rights and to stream the movie to the subscriber based on the licensing rights. This step may entail the licensing module 500 performing different functionality according to various embodiments.

For instance, in one embodiment, the subscriber may have set up an account with the licensing broker prior to submitting requests to transfer licensing rights. In this particular embodiment, at the time the subscriber set up the account, the subscriber may have provided information on the various content distribution platforms the subscriber is associated with. For example, the subscriber may have identified the subscriber's home cable service provider and provide information to identify the subscriber to the cable service provider such as the subscriber's account number with the cable service provider. In another example, the subscriber may have identified the subscriber's wireless carrier along with the subscriber's phone number associated with wireless carrier. At that time, the licensing broker may indicate to the subscriber, in various embodiments, whether the licensing broker is associated with the identified content distribution platforms (e.g., may indicated whether the licensing broker has a contractual relationship with the identified content distribution platforms). Such indication may be by way of providing a list of content distribution platforms the subscriber can select from at the time of opening an account with the licensing broker.

Further, in various embodiments, the licensing broker may obtain the capabilities of each content distribution platform at the time the licensing broker establishes a relationship with each content distribution platform. For example, the licensing broker may obtain information from a particular cable service provider that indicates that the cable service provider can provide programming content in high definition format. In addition, the licensing broker may obtain information from a particular wireless carrier that indicates the wireless carrier has the capability to provide MP3 music files to its subscribers but does not have the capability to stream visual content such as movies. In these particular embodiments, the licensing broker may save this information in one or more storage media within or outside of the licensing brokerage system 207.

Thus, in particular embodiments, the licensing module 500, upon receiving the message requesting the transfer of the subscriber's licensing rights to the movie from the hotel video service system 206 to the subscriber's cable service provider system 204, queries its stored information on the content distribution platforms it has established relationships with to determine whether the subscriber's cable service provider's system 204 has the capability to stream the movie to the subscriber's set-top box 201 on the cable service provider's distribution network 202.

In particular embodiments, this step may be the only processing the licensing module 500 performs to verify that the destination platform (e.g., the cable service provider system 204) can process the request to transfer the licensing rights for the movie to the platform (e.g., system 204). However, in other embodiments, the licensing module 500 may perform additional processing to verify the destination platform. For instance, in one embodiment, the licensing module 500 may also communicate with the destination platform to ensure the media content is available on the platform and/or to ensure the subscriber is in good-standing with the destination platform. Thus, in the example, the licensing module 500 contacts the cable service provider system 204 to ensure that the subscriber is a customer in good-standing with the cable service provider and that the movie is available to the cable service provider system 204 so that the system 204 can stream the movie to the subscriber's set-top box 201. In addition, the licensing module 500 may also verify other parameters such as whether the movie in available in a particular format on the cable service provider system 204 such as high definition. Thus, in these particular embodiments, the cable service provider system 204 sends a response to the licensing brokerage system 207 verifying whether the cable service provider is capable and willing to process the transfer of the licensing rights to its system 204.

Therefore, in Step 504, the licensing module 500 verifies that the destination platform has the capability and is willing to process the transfer of licensing rights to its system. In the example, if the licensing module 500 determines that the subscriber's cable service provider is not capable or is unwilling to transfer the licensing rights, the licensing module 500 sends an "error" message to the hotel video service system 206 indicating such information. In turn, the hotel video service system 206 may send a message to the television in the subscriber's hotel room informing him that the hotel is unable to make the transfer. In particular embodiments, the hotel video service system may request the subscriber to select a different content distribution platform for the transfer.

Further, in Step 505, the licensing module 500 verifies that the subscriber actually wants to make the transfer. In various embodiments, the licensing module 500 performs this step virtually simultaneously along with the step for verifying the transfer with the destination content distribution platform (i.e., Step 503). However, in other embodiments, these two steps may be performed at different times and in any sequential order by the licensing module 500. In one embodiment, the content distribution platform from which the licensing rights are being transferred may simply verify with the subscriber that the subscriber would like to make the transfer. For instance, in the example, the hotel video service system 206 may request the subscriber to verify that he indeed wants to transfer the licensing rights for the movie to his home cable service provider by displaying a screen on the television in the subscriber's hotel room and requesting verification by selecting one or more buttons on the remote control for the television. The hotel video service system 206 may then simply send a message to the licensing brokerage system 207 and the licensing module 500 determines from the message that the hotel video service system 206 has verified the transfer with the subscriber. However, in other embodiments, the licensing module 500 executes a user verification module 600 to perform this task. Further detail on the user verification module 600 is provided below.

Returning to Step 504, the licensing module 500 also determines whether the subscriber has verified the request to transfer the licensing rights for the media content to a second content distribution platform. As previously described, the licensing module 500 may receive an indicator from the original content distribution platform (e.g., the hotel video service system 206) providing information on whether the subscriber has verified the request. In other embodiments, the licensing module 500 may receive an indicator from the user verification module 600 providing information on whether the user verification module 600 was able to verify the transfer with the subscriber.

Thus, in the example, if the licensing module 500 determines the request has not been verified with the subscriber, the licensing module 500 sends an "error" message to the hotel video service system 206 indicating such information, shown as Step 506. In turn, the hotel video service system 206 may send a message to the television in the subscriber's hotel room informing him that his verification for the transfer could not be obtained.

If the licensing module 500 determines that the subscriber has authorization to transfer the licensing rights for the movie to the cable service provider system 204 and determines that the subscriber has verified the transfer, the licensing module 500 notifies the hotel video service system 206 that the transfer of the licensing rights to the movie to the subscriber's home cable service provider's system 204 will occur, shown as Step 507. In particular embodiments, the hotel vide service system 206 may send a message to the television in the subscriber's hotel room informing him that the transfer is being processed.

Further, in particular embodiments, if the hotel video service system 206 has not previously done so, the hotel video service system 206 sends information on the licensing rights the subscriber has with respect to the movie in the hotel video service system 206 to the licensing module 500. In addition, the hotel video service system 206 may also send an index indicating the position in the movie at which the subscriber stopped viewing the movie.

In response, in Step 508, the licensing module 500 communicates the information on the licensing rights to the subscriber's home cable service provider's system 204. As previously discussed, in various embodiments, the licensing brokerage system 207 and the cable service provider system 204 communicate over some type of network channel, such as the Internet 205 or a private network. Therefore, in the example, the cable service provider system 204 receives information on the licensing rights the subscriber has with respect to the movie on the hotel video service system 206. Further, the information may include information on the movie title, the index indicating where in the movie the subscriber stopped watching, and an identifier for the subscriber.

In response, the cable service provider system 204 creates the proper licensing controls used within the cable service provider system 204 to provide the movie to the subscriber with the same licensing restrictions. For instance, in the example, the cable service provider system 204 creates a DRM license based on the time remaining on the subscriber's original license with the hotel video service system 206 with respect to the movie and downloads the DRM license to the subscriber's set-top box 201. Further, the cable service provider system 204 obtains a copy of the movie. Typically, in various embodiments, the cable service provider system 204 retrieves a copy of the movie through its normal channels, such as the system's 204 VOD libraries or from an external source associated with the cable service provider. In other embodiments, the original content distribution platform may provide a copy of the media content to the destination content distribution platform. Therefore, in the example, the hotel video service system 206 may sends a copy of the movie (e.g., a MPEG file) to the cable service provider system 204 to stream to the subscriber's set-top box 201. The transfer of the copy of the movie may be routed through the licensing brokerage system 207, routed between the hotel video service system 206 and the cable service provider system 204, and/or routed through another third-party system. However, in many instances, further licensing arrangements may need to be implemented to allow such an exchange.

As a result, the subscriber is now able to view the remainder of the movie once he returns home from his business trip in Los Angeles. In various embodiments, the subscriber's cable service provider may provide an option in the menus for the provider's VOD service that lists the movie for which the rights have been transferred. Thus, the subscriber can select the movie and the cable service provider system 204 responds by streaming the movie to the subscriber's set-top box 201 as the system normally would when the subscriber orders a movie using the cable service provider's VOD service. Further, the cable service provider provides the movie to the subscriber by applying the licensing rights the subscriber purchased from the hotel video service at the hotel the subscriber stayed. Thus, in the example, the subscriber purchased a one-view license that expires in twenty-four hours. Therefore, the cable service provider system 204 enforces the restrictions imposed by the licensing rights purchased by the subscriber through the hotel video service.

Although, in various embodiments, the destination content distribution platform may also offer the subscriber the option to "upgrade" the transferred licensing rights. For instance, in the example, the cable service provider system 204 may offer the subscriber to extend the time period the subscriber has remaining to view the movie. In addition, the cable service provider system 204 may offer the subscriber to upgrade the service. For example, the subscriber may have rented the movie from the hotel video service in standard format and the cable service provider system 204 may offer the subscriber the option to upgrade the format to high definition.

Finally, in various embodiments, the cable service provider system 204 communicates to the licensing module 500 that the transfer of licensing rights has been successful. Thus, in particular embodiments, the licensing module 500 may communicate to the hotel video service system 206 that the licensing rights have been successfully transferred, shown as Step 509. In response, the hotel video service system 206 may cancel the subscriber's licensing rights within its system 206.

Further, in particular embodiments, the destination content distribution platform may communicate to the original content distribution platform any changes in subscriber's licensing rights with respect to the content media. For instance, the original content distribution platform may be the subscriber's cable service provider. The subscriber may have purchased licensing rights from the cable service provider to be able to view a particular movie a particular number of times (e.g., three times). The subscriber may transfer the licensing rights to the movie to the subscriber's wireless carriers so that the subscriber can watch the movie on his mobile device. At the time of transfer, the subscriber had watched the movie one time. Therefore, the licensing rights transferred to the wireless carrier indicate that the subscriber has rights to view the movie two more times.

The wireless carrier receives information indicating that the subscriber has licensing rights to view the movie twice and creates a DRM license based on the subscriber licensing rights and downloads the DRM license to the subscriber's wireless device. In turn, the subscriber requests to watch the movie on his wireless device and the wireless carrier streams the movie to his wireless device. In addition, the wireless carrier communicates to the subscriber's cable service provider the change in the subscriber's licensing rights (e.g., communicates to the cable service provider that the subscriber only has licensing rights to view the movie one time). In various embodiments, this communication can be channeled through the licensing broker (e.g., licensing module 500), can be directly channeled between the wireless carrier and the cable service provider, or can be channeled through another third party.

Accordingly, the cable service provider adjusts the subscriber's licensing rights with respect to the movie in the cable service provider system 204. For instance, the cable service provide deletes the current DRM license with respect to the movie on the subscriber's set-top box 201 and replaces the DRM license with a new license that indicates that the subscriber only has rights to view the movie once more. Thus, as a result in various embodiments, the subscriber's licensing rights with respect to the movie are purchased and these rights can be shared and updated on multiple content distribution platforms.

User Verification Module

Accordingly, FIG. 6 illustrates a flow diagram of the user verification module 600. In various embodiments, this module 600, similar to the licensing module 500, resides in the licensing brokerage system 207. The flow diagram shown in FIG. 6 may correspond to the steps carried out by the processor 60 in the licensing brokerage server 300 shown in FIG. 3 as it executes the module 600 in the server's RAM memory 67 according to various embodiments.

In particular embodiments, the licensing broker stores information that includes a preferred verification protocol for the subscriber. For example, during the time the subscriber enrolled with the licensing broker, the subscriber may have selected a preferred process for verifying transfer requests for the subscriber. Such verification protocols may include, for instance, verifying via SMS messaging, a phone call, an email, or other communication mechanism, such as a stand-alone module that resides on a device of the subscriber. Thus, in Step 602, the user verification module 600 obtains the verification protocol for the subscriber from this information. That is, in particular embodiments, the user verification module 600 retrieves the subscriber's verification protocol from a storage medium.

In Step 603, the user verification module 600 contacts the subscriber based on the subscriber's verification protocol. For instance, in one embodiment, the user verification module 600 facilitates sending the subscriber a SMS message to the subscriber's mobile device. In this particular embodiment, the user verification module 600 is in communication with the subscriber's wireless carrier's system 209. The user verification module 600 sends a request to the subscriber's wireless carrier's system 209 to have the system 209 send a SMS message to the subscriber's wireless device 210 that requests the subscriber to reply back to the message with specific verification information. For example, the SMS message may request the subscriber to respond with a username and/or a password. In another example, the SMS message may ask the subscriber to respond with an answer to a particular question, such as "provide your mother's maiden name" or "provide your favorite pet's name."

In this particular instance, the subscriber receives the SMS message and texts back the appropriate response along with the appropriate information. In turn, the wireless carrier's system 209 forwards at least a portion of the information received in the response to the user verification module 600.

In other embodiments, the user verification module 600 may contact the subscriber based on other verification protocols. For instance, in one embodiment, the user verification module 600 sends an email to the subscriber and requests the appropriate information to be sent back to the user verification module 600 via a response email. In another embodiment, the user verification module 600 places a telephone call to the subscriber and requests the subscriber to provide appropriate information. Yet, in another embodiment, the subscriber may be requested to access a website that is provided by the licensing broker system 207 (or cable provider system 204) over the Internet by using a personal computer 208 and to enter the appropriate information needed to verify the subscriber would like to execute the transfer. One of ordinary skill in the art can envision numerous authentication protocols in light of this disclosure.

In Step 604, the user verification module 600 receives the subscriber verification information. For instance, in the embodiment in which the subscriber, receives a SMS message, the user verification module 600 receives the information provided in the response from the subscriber to the SMS message. The user verification module 600 determines from the information whether the subscriber has confirmed that the subscriber would like to transfer the licensing rights for the particular media content. In one embodiment, this entails the user verification module 600 comparing the information received from the subscriber with information stored for the subscriber. For example, the user verification module 600 compares the username and password provided by the subscriber in the response with a username and password stored for the subscriber. In another example, the user verification module 600 determines whether the subscriber has provided a correct answer to a particular question asked in the request sent to the subscriber and/or has answered positively to a question as to whether the subscriber would like to transfer the licensing rights associated with the media content.

Thus, in Step 605, if the user verification module 600 determines verification has not been obtained from the subscriber, the user verification module 600 facilitates sending a denial to the original content distribution platform, shown as Step 606. For instance, in various embodiments, the user verification module 600 sends an indicator to the licensing module 500 that the subscriber's request has not been verified. In turn, the licensing module 500 facilitates sending a message to the subscriber (through the original content distribution platform) indicating to the subscriber that his request could not be verified and therefore the transfer of licensing rights has not been approved. Thus, in the example, the hotel video service system 206 displays a message on the television in the subscriber's hotel room informing the subscriber that his verification to transfer the licensing rights for the movie to his home cable service provider's system 204 could not be obtained. As a result, in various embodiments, the user verification module 600 provides a mechanism to ensure that the actual subscriber is requesting the transfer and not someone pretending to be the subscriber.

If the user verification module 600 determines the subscriber's request has been verified, in various embodiments, the user verification module 600 facilitates sending a confirmation to the original content distribution platform that the subscriber's request has been verified, shown in Step 607. In one embodiment, the user verification module 600 sends an indicator to the licensing module 500 that the subscriber request has been verified. In response, the licensing module 500 sends a message to the original content distribution platform that the request to transfer the licensing rights for the media content has been verified by the subscriber. Thus, in the example, the licensing module 500 send a message to the hotel video service system 206 indicating that the subscriber's request has been verified. In particular embodiments, the hotel video service system 206 provides a message on the television in the subscriber's hotel room confirming to the subscriber that his request has been verified. In another embodiment, the user verification module 600 sends the message directly to the original content distribution platform.

Interface Module

In various embodiments, the interface module 700 is a component that resides on a subscriber's device that is configured to receive requests from the subscriber to transfer licensing rights for particular media content and to communicate the request so that the transfer can occur. For instance, in various embodiments, the interface module 600 resides on the subscriber's set-top box 201 associated with the subscriber's cable service provider. In these particular embodiments, the interface module 600 may be a component of the cable service provider's VOD service and may be accessed through the VOD service menus provided on the subscriber's set-top box 201 and television. However, in other embodiments, the interface module 700 may be a stand-alone module that resides on the set-top box 201 and may provide its own access menu(s).

It should be noted that the interface module 700 may reside on any number of devices associated with the subscriber. For instance, in various embodiments, the interface module 700 may reside on the subscriber's wireless device so that the subscriber may request media licensing rights for media content to be transferred from the subscriber's wireless device (and wireless carrier) to another device on a second distribution platform. However, for illustrative purposes, the interface module 700 is described below with respect to residing on the subscriber's set-top box 201.

Accordingly, FIG. 5 illustrates a flow diagram of the interface module 700 used according to various embodiments of the invention. This flow diagram may correspond to the steps carried out by the processor 404 in the settop box 201 shown in FIG. 4 as it executes the module 700 in the box's RAM memory 417 according to various embodiments.

As described above, the interface module 700 may be a component of the cable service provider's VOD service or may be a stand-alone module on the subscriber's set-top box 201. Accordingly, in one embodiment, the subscriber accesses the VOD service and selects an option provided on a menu for transferring licensing rights associated with a particular media content to another device on a second distribution platform. In another embodiment, the option to transfer rights may be accessed as a stand-alone program on the subscriber's set-top box 201 by selecting one or more buttons on the subscriber's remote control in communication with the set-top box 201.

The interface module 700, in various embodiments, prompts the subscriber to enter information associated with the transfer the subscriber would like to perform. For instance, in one embodiment, the interface module 700 requests the subscriber to identify the particular media content he would like to transfer rights for and the device and/or destination content distribution platform he would like to transfer the rights to. This information may be entered by the subscriber using various techniques. For example, the interface module 700 may provide a list of the current media content the subscriber has licensing rights for along with detail on the licensing rights for the media content found on the list. Therefore, in this example, the subscriber may scroll through the list to select the desired media content for the transfer. Further, the interface module 700 may provide a list of the devices and/or content distribution platforms the subscriber may transfer the licensing rights to. Thus, the subscriber may also scroll through this list to select the destination device and/or destination content distribution platform.

In addition, in various embodiments, the interface module 700 may request the subscriber to enter information to use during the verification process. For instance, in one embodiment, the interface module 700 may request the subscriber to enter a username and/or password or other information that may be forwarded to subscriber for verification purposes (as previously described).

Thus, in Step 702, the interface module 700 receives input from the user. In response, the interface module 700 sends the user input to the cable service provider's system 204, shown as Step 703. For instance, in one embodiment, the interface module 700 sends the input over the cable service provider's distribution network 202 to the headend 203. In this particular embodiment, the headend 203 interprets the input and directs the input to the corresponding component(s) residing in the cable service provider system 204. As previously described, in various embodiments, the cable service provider system 204 sends the request to the licensing brokerage system 207 to verify that destination content distribution platform is willing and able to have the licensing rights for the media content transferred to the destination content distribution platform and to verify that the subscriber has actually requested the transfer.

The cable service provider system 204 receives information (e.g., one or more messages) back from the licensing brokerage system 207 indicating whether the subscriber and destination content distribution platform have verified the transfer. If the information indicates verification has been received from the user and the destination content distribution platform is willing and able to accept the transfer, the cable service provider system 204 performs the transfer of licensing rights with the licensing brokerage system 207 and the destination content distribution platform as previously described. Once the transfer has been completed, in various embodiments, the cable service provider system 204 receives confirmation from the licensing brokerage system 207 and the cable service provider system 204 communicates the confirmation to the subscriber's set-top box 201. If the information indicates verification has not been received from the user and/or the destination platform is unwilling and/or unable to accept the transfer, the cable service provider system 204 communicates such information to the subscriber's set-top box 201.

Thus, in Step 704, the interface module 700 receives the information and determines from the information whether the transfer has been verified and completed. For example, in the case wherein the interface module 700 determines from the information that confirmation from the user was not obtained for the transfer and/or the destination content distribution platform is unwilling and/or is not capable of facilitating the transfer, the interface module 700 sends an error message that is displayed on the subscriber's television that informs the subscriber that his request cannot be processed, shown as Step 705. In particular embodiments, the interface module 700 may then request the subscriber to select another destination content distribution platform.

If the interface module 700 is able to determine from the information sent from the cable service provider system 204 that the request has been verified by the user and the destination content distribution platform and has been completed, the interface module 700 sends a confirmation message to display on the subscriber's television informing the subscriber that the transfer was successful, shown as Step 706. Thus, in this particular instance, the subscriber is now able to view the content media on his device associated with the destination content distribution platform.

Finally, in various embodiments, the interface module 700 deletes the licensing rights associated with the media content for which the rights have been transferred to the destination content distribution platform, shown as Step 707. For example, the interface module 700 may facilitate having a DRM license deleted on the subscriber's set-top box 201 for the particular media content.

Subscriber Device Module

As previously described, in various embodiments, verification protocols are used to facilitate verifying transfer requests with subscribers. Such verification protocols may include, for instance, verifying via SMS messaging, a phone call, an email, or other communication mechanism. In various embodiments, one such mechanism is a module 800 that resides on the subscriber's device 210. For instance, in one embodiment, the licensing broker provides the device module 800 and the subscriber installs (e.g., downloads) the module 800 onto his device. (For example, the licensing broker may provide the module 800 as an application to download onto an iPhone® and/or Blackberry® device.)

In various embodiments, the module 800 provides one or more interactive screens that the subscriber uses to receive a verification request and to send a response to the verification request. In particular embodiments, the module 800 may be adapted to communicate with the system sending the request (e.g., the licensing brokerage system 207 and/or the cable service provider system 204). For example, in one embodiment, the request and response are sent over the Internet (possibly through a secure channel such as VPN and/or an encrypted message). In another example, the request and response are sent over a wireless provider's network.

Accordingly, FIG. 8 illustrates a flow diagram of a subscriber device module 800 according to various embodiments. Thus, in various embodiments, a system (such as the licensing brokerage system 207 or the cable service provider system 204) sends a request to the subscriber to verify that the subscriber has requested the transfer of licensing rights. For example, in one embodiment, the licensing brokerage system 207 sends the request over the Internet to the module 800 residing on the subscriber's device 210. In another embodiment, the licensing brokerage system 207 sends a request to the subscriber's wireless provider and the wireless provider sends a message over the wireless provider's network to the module 800. Thus, in Step 802, the module 800 receives the request and notifies the subscriber. The notification may entail producing a sound, visual effect, and/or vibration on/of the device 210. The subscriber enters a screen for the module 800 and the request is displayed for the subscriber. For example, the request may state, "have you requested to transfer a movie from a first content distribution platform to a second content distribution platform? If so, please enter your username and password to confirm." In response, the subscriber types the subscriber's username and password into the screen using a keyboard on the device and selects a send button. The module 800 receives the subscriber's input in Step 803 and sends the input over a communication channel (such as the Internet) to the system that originated the request in Step 804.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A system for transferring licensing rights for a user for a particular media content associated with a first device on a first distribution platform to be associated with a second device on a second distribution platform comprising:
   at least one computer processor configured to:
   (a) receive a request to transfer the licensing rights associated with the first device on the first distribution platform to be associated with the second device on the second distribution platform for the particular media content, the request comprising user identification information for the user and licensing rights information on the licensing rights of the user for the particular media content;
   (b) contact the user to request the user to provide a user verification to transfer the licensing rights associated with the first device on the first distribution platform to be associated with the second device on the second distribution platform for the particular media content;
   (c) receive the user verification from the user;
   (d) determine whether the user verification indicates the user would like to transfer the licensing rights;
   (e) in response to the user verification indicating to transfer the licensing rights, send a message to the second distribution platform, the message comprising
      at least a portion of the licensing rights information on the licensing rights of the user for the particular media content,
      an identifier associated with the particular media content, and
      an index indicating a position where the user stopped using the particular media content, wherein the licensing rights are associated with the second device so that the user can play the particular media content on the second device;

(f) receive use information the second distribution platform, the use information comprising information on how the particular media content is used on the second device; and (g) in response to receiving the use information, send a message to the first distribution platform comprising at least a portion of the use information, wherein upon receipt of the message, the message causes the first distribution platform to adjust the licensing rights for the user for the particular media content based at least in part on the portion of the use information.

2. The system of claim 1 further comprising memory and wherein the at least one processor is configured to contact the user to request the user to provide a user verification by:

(1) obtain a verification protocol stored in the memory based on the user identification information;

(2) contact the user over a communication channel based on the verification protocol to request the user verification; and (3) receive the user verification from the user over the communication channel.

3. The system of claim 2, wherein the communication channel is a wireless carrier network.

4. The system of claim 1, wherein the request further comprises platform identification information for the second distribution platform and the at least one processor is configured to:

identify the second distribution platform based at least in part on the platform identification information;

contact the second distribution platform to request the second distribution platform to provide a platform verification that the user has authorization to transfer the licensing rights to be associated with the second device on the second distribution platform for the particular media content;

receive the platform verification from the second distribution platform;

determine whether the platform verification indicates the user can transfer the licensing rights to be associated with the second device; and in response to the platform verification indicating the user can transfer the licensing rights to be associated with the second device, perform (b) through (e).

5. The system of claim 1, wherein the at least one processor is configured to:

receive a transfer indicator from the second distribution platform, the transfer indicator comprising an acknowledgement that the second distribution platform has successfully associated the licensing rights with the second device; and send a success message to the first distribution platform indicating the second distribution platform has successfully associated the licensing rights with the second device.

6. The system of claim 1, wherein, upon receipt of the success message, the first distribution platform cancels the licensing rights associated with the first device.

7. The system of claim 1, wherein the particular media content is a movie, the first distribution platform is a cable service provider platform, and the second distribution platform is a wireless carrier service platform.

8. The system of claim 1, wherein the particular media content is a movie, the first distribution platform is a hotel video service platform, and the second distribution platform is a cable service provider platform.

9. The system of claim 1, wherein the particular media content is a movie, the first distribution platform is a first cable service platform, and the second distribution platform is a second cable service provider platform.

10. A method for transferring licensing rights for a user for a particular media content associated with a first device on a first distribution platform to be associated with a second device on a second distribution platform, the method comprising the steps of:

(a) receiving a request over a network by at least one computing device comprising at least one processor to transfer the licensing rights associated with the first device on the first distribution platform to be associated with the second device on the second distribution platform for the particular media content, the request comprising user identification information for the user and licensing rights information on the licensing rights of the user for the particular media content;

(b) contacting the user by the at least one processor to request the user to provide a user verification to transfer the licensing rights associated with the first device on the first distribution platform to be associated with the second device on the second distribution platform for the particular media content;

(c) receiving the user verification from the user;

(d) determining by the at least one processor whether the user verification indicates to transfer the licensing rights;

(e) in response to the user verification indicating to transfer the licensing rights, sending a message by the at least one processor to the second distribution platform, the message comprising at least a portion of the licensing rights information on the licensing rights of the user for the particular media content, an identifier associated with the particular media content, and an index indicating a position where the user stopped using the particular media content, wherein the licensing rights are associated with the second device so that the user can play the particular media content on the second device;

(f) receiving use information from the second distribution platform, the use information comprising information on how the particular media content is used on the second device; and (g) in response to receiving the use information, sending a message by the at least one processor to the first distribution platform comprising at least a portion of the use information, wherein upon receipt of the message, the message causes the first distribution to adjust the licensing rights for the user for the particular media content based at least in part on the portion of the use information.

11. The method of claim 10, wherein the step of contacting the user to request the user to provide user verification comprises the sub-steps of:

(1) obtaining by the at least one processor a verification protocol stored in memory based on the user identification information;

(2) contacting the user by the at least one processor over a communication channel different than the network based on the verification protocol to request the user verification; and (3) receiving the user verification from the user over the communication channel.

12. The method of claim 10, wherein the request further comprises platform identification information for the second distribution platform and the method comprises the steps of:

identifying the second distribution platform based at least in part on the platform identification information;

contacting the second distribution platform by the at least one processor to request the second distribution platform to provide a platform verification that the user has authorization to transfer the licensing rights to be associated with the second device on the second distribution platform for the particular media content;

receiving the platform verification from the second distribution platform;

determining by the at least one processor whether the platform verification indicates the user can transfer the licensing rights to be associated with the second device; and in response to the platform verification indicating the user can transfer the licensing rights to be associated with the second device, performing steps (b) through (g).

13. The method of claim 10 further comprising the steps of:

receiving a transfer indicator from the second distribution platform, the transfer indicator comprising an acknowledgement that the second distribution platform has successfully associated the licensing rights with the second device; and sending by the at least one processor a success message to the first distribution platform indicating the second distribution platform has successfully associated the licensing rights with the second device.

14. The method of claim 10, wherein, upon receipt of the success message, the first distribution platform cancels the licensing rights associated with the first device.

15. The method of claim 10, wherein the particular media content is a movie, the first distribution platform is a cable service provider platform, and the second distribution platform is a wireless carrier service platform.

16. The method of claim 10, wherein the particular media content is a movie, the first distribution platform is a hotel video service platform, and the second distribution platform is a cable service provider platform.

17. The method of claim 10, wherein the particular media content is a movie, the first distribution platform is a first cable service platform, and the second distribution platform is a second cable service provider platform.

18. A non-transitory computer-readable storage medium containing executable code for transferring licensing rights for a user for a particular media content associated with a first device on a first distribution platform to be associated with a second device on a second distribution platform, that when executed by a processor of a computer device causes the processor to:

(a) receive a request to transfer the licensing rights associated with the first device on the first distribution platform to be associated with the second device on the second distribution platform for the particular media content, the request comprising user identification information for the user and licensing rights information on the licensing rights of the user for the particular media content;

(b) contact the user to request the user to provide a user verification to transfer the licensing rights associated with the first device on the first distribution platform to be associated with the second device on the second distribution platform for the particular media content;

(c) receive the user verification from the user;

(d) determine whether the user verification indicates to transfer the licensing rights;

(e) in response to the user verification indicating to transfer the licensing rights, send a message to the second distribution platform, the message comprising at least a portion of the licensing rights information on the licensing rights of the user for the particular media content, an identifier associated with the particular media content, an index indicating a position where the user stopped using the particular media content, wherein the licensing rights are associated with the second device so that the user can play the particular media content on the second device;

(f) receive use information the second distribution platform, the use information comprising information on how the particular media content is used on the second device; and (g) in response to receiving the use information, send a message to the first distribution platform comprising at least a portion of the use information, wherein upon receipt of the message, the message causes the first distribution platform to adjust the licensing rights for the user for the particular media content based at least in part on the portion of the use information.

* * * * *

UNITED STATES PATENT AND TRADEMARK OFFICE
CERTIFICATE OF CORRECTION

PATENT NO. : 8,356,359 B2  
APPLICATION NO. : 12/762505  
DATED : January 15, 2013  
INVENTOR(S) : Rouse et al.

Page 1 of 1

It is certified that error appears in the above-identified patent and that said Letters Patent is hereby corrected as shown below:

In the Drawings:

In Fig. 2, Sheet 2 of 8, delete " " and insert -- 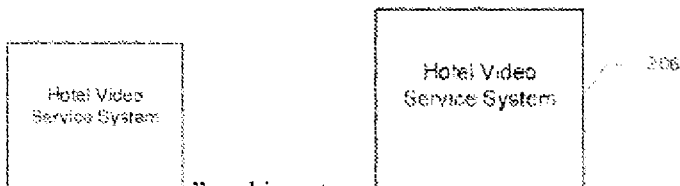 --, therefor.

In Fig. 3, Sheet 3 of 8, for Tag "600", in Line 1, delete "Verfication" and insert -- Verification --, therefor.

In the Specification:

In Column 6, Line 22, delete "and," and insert -- and --, therefor.

In Column 22, Line 41, delete "subscriber," and insert -- subscriber --, therefor.

In the Claims:

In Column 29, Line 17, in Claim 12, delete "through (g)." and insert -- through (e). --, therefor.

Signed and Sealed this  
Eighteenth Day of June, 2013

Teresa Stanek Rea  
*Acting Director of the United States Patent and Trademark Office*